United States Patent [19]

Loustau

[11] Patent Number: 4,494,580
[45] Date of Patent: Jan. 22, 1985

[54] METHOD AND MACHINE FOR CUTTING ELECTRIC LEADS OF SPECIFIC LENGTH AND FOR PROCESSING AND EQUIPPING THE TWO ENDS OF THESE LEADS

[75] Inventor: Désiré Loustau, Aix-en-Provence, France

[73] Assignee: Automatismes Et Techniques Advancees, La Barque, France

[21] Appl. No.: 421,317

[22] Filed: Sep. 22, 1982

[30] Foreign Application Priority Data

Sep. 24, 1981 [FR] France ................................ 81 18181

[51] Int. Cl.³ .............................................. B21F 27/00
[52] U.S. Cl. ........................................ 140/1; 140/102
[58] Field of Search ................. 140/1, 102, 105, 71 R; 29/33 M, 33 F, 564.6, 564.8

[56] References Cited

U.S. PATENT DOCUMENTS

| 1,821,894 | 9/1931 | Otaka | 140/102 |
| 3,353,571 | 11/1967 | Durr et al. | 140/1 |
| 3,479,717 | 11/1969 | Howard | 29/753 |
| 3,957,092 | 5/1976 | Loy et al. | 140/115 |

OTHER PUBLICATIONS

European Patent Application No. A 0 007 681.

*Primary Examiner*—Francis S. Husar
*Assistant Examiner*—Linda McLaughlin

[57] ABSTRACT

The invention relates to a method and a machine for cutting off leads of specific length from electric wire and for processing and equipping the ends of the wire leads. The machine comprises an endless conveyor which bears pairs of close-set clamps and a paying-out station for the wire which pays out the latter tangentially to the conveyor. Cams cause the clamps of each pair to pivot by a quarter revolution in reverse direction from one another. A balance rod forms in the wire situated between two clamps, loops of specific length.

7 Claims, 11 Drawing Figures

METHOD AND MACHINE FOR CUTTING ELECTRIC LEADS OF SPECIFIC LENGTH AND FOR PROCESSING AND EQUIPPING THE TWO ENDS OF THESE LEADS

The present invention relates to a method and a machine for cutting off, from an electric wire, leads (or pieces) of particular lengths and for processing and equipping the two ends of these leads.

The field of the invention is that of the construction of machines of the automatic or robot type.

Numerous electrical circuits for weak currents require leads of predetermined length, whose ends are worked to strip them, tin them and to fix thereto various connection devices such as lugs and insulators.

Such leads are used, for example, to equip racks or relay panels, such as electrical bundles of automobiles or of airplanes, to equip telephone installation, etc . . . .

PRIOR ART

Electric wires insulated by a sheath of plastics material are delivered in reels or spools of great length and machines are already known which comprise a wire paying-out reel, a coder or sensor which comprises two rollers, between which the wire passes, which measures the length of wire which passes by and which emits a signal when this length reaches a predetermined value, a cutting device which shears the wire when the foregoing sensor has measured the predetermined length and two strippers located on each side of the cutting device which enable a piece of insulating sheath to be removed to bare the two wire ends located on each side of the cut.

These known machines deliver batches of straight wire leads of the same length, having two bared ends.

Associated with these machines are conveyors perpendicular to the leads emerging from the machine, which move the latter one by one transversely to present one of the two ends at stations for automatic fastening of connecting elements such as lugs, bushes, plugs, etc . . . .

These known machines only permit the working of one of the two ends of each wire lead.

To process the second end of each lead, devices must be associated therewith to take up each straight wire lead and move it parallel to itself in order to bring the second end in front of an element-fastening station, which results in complex automatic mechanisms.

It is an object of the present invention to provide automatic machines comprising automatic handling means for the wire which enable the latter to be cut up into leads of predetermined length and then to present the two ends of each wire lead side-by-side and parallel opposite processing stations located on the same side of the conveyor, so that it is possible to work the two ends simultaneously or separately, without having to effect other manipulations of the leads.

It is anther object of the present invention to provide automatic machines which enable the wire to be cut off into leads which each have a specific length, but which can follow one another with different lengths, so that it is possible to obtain at the output of the machine batches of equipped leads having different lengths and which correspond, for example, to the bundle of wire leads necessary for the electrical equipment of a car or of an aircraft part.

GENERAL DESCRIPTION OF THE INVENTION

According to the invention there is provided a machine for cutting off wire into leads and equipping the ends of the leads, said machine comprising:

a station for paying-out wire in a rectilinear direction;

a transfer conveyor which bears pairs of close-set clamps distributed over its periphery, which periphery is tangential to said direction of paying-out, close to the forward end of said paying out station;

balance rod means located at the forward end of said paying-out station and pivotally mounted on an axle parallel to the direction of paying out the wire, which balance rod means bears a presser-roller which urgesn said wire against a drive roller to form loops;

a wire cutting station located perpendicular to said conveyor forward of said paying-out station;

and means for pivoting the two clamps of each pair by a quarter revolution in reverse direction from one another after said wire cutting station, in order to cause the two ends of each loop situated beyond said clamps quarter revolution to cause them to pass from a direction tangential to a direction transverse to said conveyor in which they protude outside the periphery of said conveyor.

As a result the invention provides a machine of the automatic or robot type which pays out the wire, cuts it off into leads of particular lengths and which carries out on the two ends of each lead, all the processing and electrical connection element-applying operations.

The forming of loops of specific lengths in the wire which is paid out enables wire leads of desired length to be obtained, whose two ends are held by two close-set gripping means, which are located at the same distance from one another, whatever the length of the loop.

This loop formation has numerous adantages. It enables the determination of the length of each lead to be entirely dissociated from the operation of cutting the wire. It enables, due to a rotation of the two clamps which hold the two ends of each lead, the presentation of these two ends, one beside the other, extending perpendicularly outside of the conveyor which bears the clamps. As a result it is possible to provide a large number of stations or processing units at the periphery of the transfer conveyor and these processing units can work or equip the two ends of each lead simultaneously or one alone.

As the pairs of clamps are uniformly distributed at the periphery of the conveyor, it is possible to advance the transfer conveyor each time through an angle which corresponds to the angular spacing between two successive pairs of clamps and to arrange the processing units opposite the stopping positions of the ends of the leads, so that during each stopping period of the conveyor, all the processing units can operate simultaneously, each on the two ends of a lead.

Due to the fact that the positions of the ends to be processed are entirely independent of the length of the loops, it is possible to form successively leads having different specific lengths and thus to obtain at the output of the machine assorted sets of wire leads of different lengths corresponding, for example, to the lengths necessary for a bundle of electric wires of a vehicle. This possibility does not exist in known machines which deliver wire leads of the same length which must then be regrouped to obtain bundles of wires of different lengths.

The driving of the wire in the paying-out unit by means of a stepping motor and a notched belt enables the determination with sufficient precision, of the length of each lead by determining the number of steps during which the paying out motor should operate in the course of the formation of each loop.

The addition of a coder which measures the length of wire paid out and a logic unit which compares the length measurement indicated by the coder with the length measurement resulting from the number of operating steps of the paying-out motor, enables the machine to be stopped in the case of an error or to be automatically recalibrated and thus avoid the latter automatically delivering quantities of wire leads not corresponding to the desired length.

The conveyor constituted by a circular plate driven by a motor-reducing gear unit including a cycloidal reducing gear with very small backlash enables the obtaining of very great precision, of the order of 0.1 mm in the positioning of the ends of the wire leads during the stopping time of the conveyor and this precision is necessary for certain processing units, particularly those which must thread a sheath or a tubular bush of small diameter onto the ends of the wire.

BRIEF DESCRIPTION OF THE DRAWINGS

The following description refers to the accompanying drawings which show, without having any limiting nature, an embodiment of a machine according to the invention.

DESCRIPTION OF A PREFERRED EMBODIMENT

Figure 1:
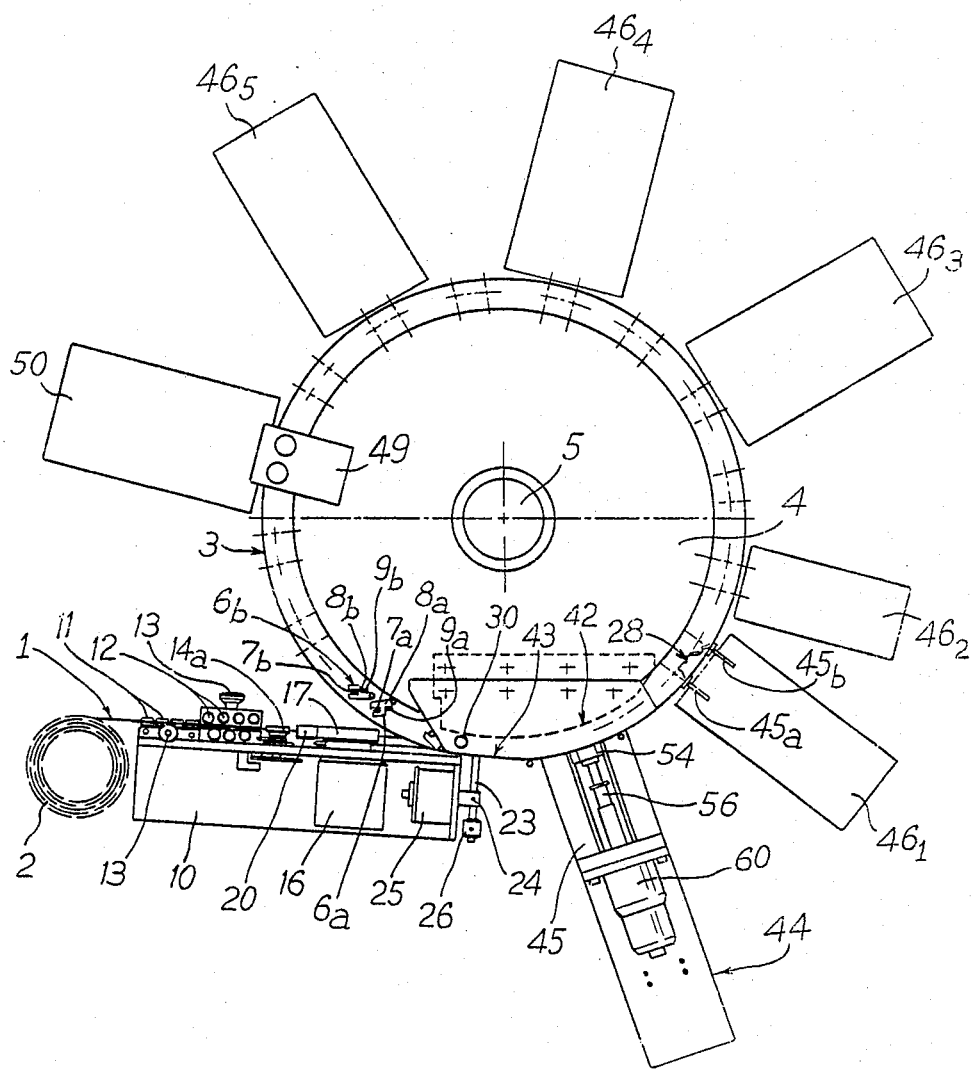
FIG. 1 is an overall plan view of the machine.

FIG. 1 shows a plan view of an automatic type machine or transfer machine, which pays out an electric wire 1 wound on a spool 2, which cuts it off into leads of specific length, which bares the ends, which processes the two ends of each lead, for example, to fix on the latter, without any manual intervention, various connecting devices such as lugs, bushes, or plugs or to tin them.

The machine according to the invention comprises an endless transfer conveyor or carrousel 3, around which are arranged various stations, modules or units effecting automatically the various operations necessary for the processing and for the equipping of the two ends of each wire lead.

In the example shown, the transfer conveyor 3 comprises a circular plate 4, which is rotated by a motor reducing-gear unit 5, equipped with the stepping motor and with a cycloidal reducing gear with very low backlash. The stepping motor effects, for example, one revolution in 200 steps and the reducing gear has a reduction ratio of the order of 1/50, so that the linear movement of the periphery of the disk 4 is of the order of 0.1 mm per step.

In addition, the low backlash reducing gear ratio enables very great accuracy of the stopping positions which is of the order of 0.1 mm on the peripheral position.

This high precision is important for the good presentation of the ends of the wires opposite the processing stations.

The circular plate 4 could be replaced by other types of endless conveyors, for example non-circular shaped chain conveyors. However, construction in the form of a circular plate is a preferred embodiment as a result of the rigidity of the plate and the high accuracy of the peripheral positioning which results therefrom.

The plate 4 has a sufficient outer diameter to enable the placing at its periphery of the various necessary processing stations. For example, the diameter of the plate 4 is of the order of a meter.

The plate 4 bears at its periphery close-set pairs of clamps 6a, 6b, regularly distributed. For clarity in the drawing, only two pairs of clamps have been shown in FIG. 1. Each clamp is mounted on an axle perpendicular to the plate, respectively 7a, 7b, and includes an arm 8a, 8b which is normally held urged against the stop 9a, 9b by a spiral spring. The spiral springs act in reverse direction from one another. In the example shown the forward clamp 6a of each pair is thrust against the stop 9a in the counterclockwise direction, whilst the rear clamp 6b of each pair is urged in the clockwise direction.

The clamp will be described in detail later.

The machine according to the invention comprises a first station 10 or input module for the wire, which pays out the wire 1 wound on the spool 2. The unit 10 for unwinding wire is shown in detail in FIGS. 2 and 3.

It is seen in FIG. 1 that the unwinding station 10 is placed tangentially to the plate 4, so that the wire which emerge at the forward end of the module 10, parallel to this module, arrives tangentially below the periphery of the plate 4.

By convention, the forward end of the module 10 situated on the side of the output of the wire is called the forward end and the end situated on the side of the spool 2 is called the rear end.

The paying-out station 10 comprises, in known manner, on its lateral surface situated on the side of the conveyor 4, sets of pairs of rollers 11 located in vertical planes and 12 located in horizontal planes, between which the wire 1 passes. These rollers have the function of straightening the wire if it is folded or twisted.

The rollers are mounted on supports which it is possible to close up more or less to one another by means of threaded rods provided with a manipulating knob 13 in order to take into account the diameter of the electric wire.

The station 10 then includes a pair of rollers 14a, 14b which are mounted loosely on their axle and between which the wire 1 passes. The upper roller 14a is held urged against the wire by a spring 15.

One of the rollers is rotated by the wire and it drives an incremental coder which delivers pulses proportional in number to the length of wire passing through the coder. This coding is obtained, for example, by means of a perforated disk which is driven by the roller 14a and which passes between a light source and a photoelectric cell or by any other equivalent revolution detector.

The paying-out station of the wire comprises a stepping motor 16 which drives a pulley 17 driving a roller 18 through a notched belt 19 so that there is no slippage between the pulleys and the belt.

The upper strand of the notched belt moves forwards and it is situated in the horizontal plane passing through the wire 1. Above the pulley 18 is a pressure roller 20 which is hinged on an axle 21 and which is kept urged against the wire by a spring 21a. The lower generator of the presser roller 20 is situated slightly forward of the upper generator of the roller 18, so that it urges the wire against the rectilinear part of the back of the notched belt 19 and so that there is no slippage between the wire and the belt.

The stepping motor is controlled by a programming unit which rotates it each time by a number of steps corresponding to the desired length of the wire lead.

It is not necessary to cut off wire leads whose length is determined with very great accuracy and the stepping motor 16 includes, for example, 200 steps per revolution, each step corresponding to a travel of one millimeter of the notched belt.

At the front of the lateral surface situated on the side of the conveyor 4, the paying-out station includes a smooth roller 22, which is rotated by a second notched belt 22a, driven by the stepping motor 16. The roller 22 is located beneath the horizontal plane passing through the wire 1.

At the forward end, the paying-out station includes a balance bar 23 which is mounted on an axle 24 parallel to the wire and which is rotated by about a quarter of a revolution by a rotary electro-magnet 25. The balance bar 23 carries, at one end, a counterweight 26 and at the other end, a grooved roller 27 which urges the wire 1 against the roller 22 when the balance bar is in horizontal position.

The rollers 27 and 22 have the function of guiding the wire 1 for which it forms loops 28 of particular length.

Figure 2:
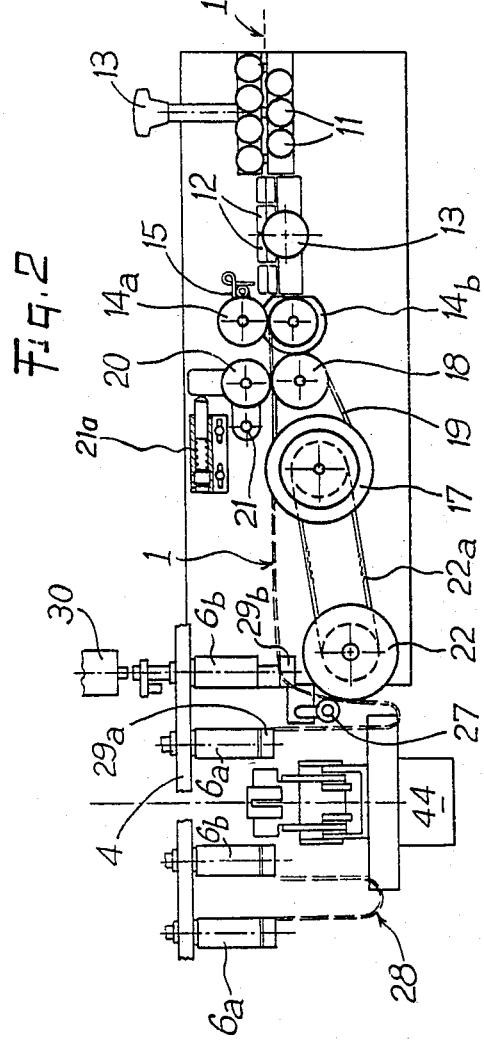
FIGS. 2 and 3 are views in elevation and a view from above of the paying-out station for the wire respectively and FIG. 9 a view from the front.
Figure 3:
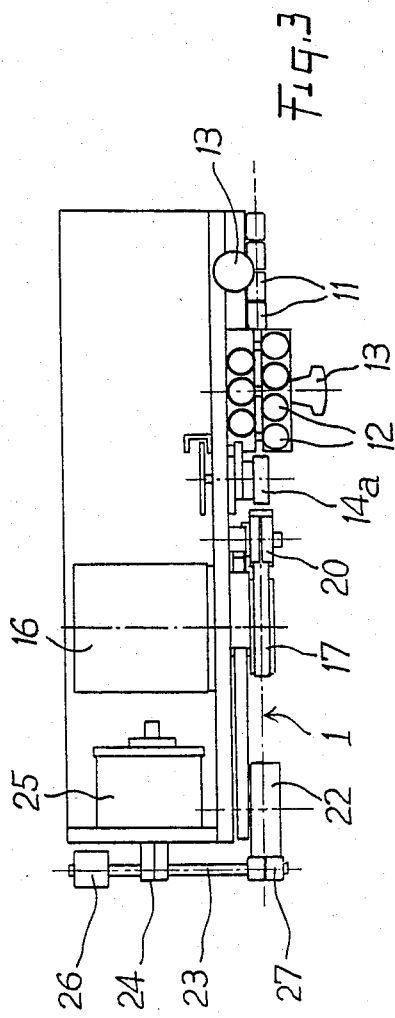

In FIG. 2 is shown a part of the plate 4 and a pair of clamps 6a, 6b borne by the latter, in the position that they occupy during the formation of a loop.

At the beginning of the formation of a loop 28, the programmer actuates an electro-magnet 30 which is placed at a fixed station to the vertical of the position which the axle of the clamp 6a has just occupied and whose plunger comes to thrust against the valve of the clamp 6a, which causes the closing of the jaws 29a of the clamp 6a. The wire 1 hence is gripped in the clamp 6a. The programmer then controls the starting of the transfer conveyor to cause it to advance by a length equal to that which separates the clamp 6a from the clamp 6b, so that the clamp 6b becomes placed beneath the electro-magnet 30.

The stepping motor 16 driving the paying-out unit rotates at the same time.

When the clamp 6b has arrived beneath the electro-magnet 25, the transfer conveyor 3 is stopped, whilst the stepping motor 16 continues to rotate. The programming unit controls the rotary electro-magnet 25 which causes the balance bar 23 to tilt.

The roller 27 drives the wire 1 downwards and comes to support it against the driving roller 22. The diameter of the driving pulley of the roller 22 is calculated so that the linear speed of the periphery of the roller 22 is very slightly higher than the linear speed of the notched belt 19, so that the strand of wire 1, which comes between the pair of rollers 18, 20 and the pair of rollers 22, 27 is slightly tensioned and the wire is correctly positioned in the jaw 29b, on the closing of the latter.

When the stepping motor 16 has effected a number of steps corresponding to the programmed length of the wire lead, it stops and the programmer actuates the electro-magnet 30 which actuates the closing of the jaw 29b of the second clamp.

In this way a wire loop 28 is formed, of a specific length, whose two ends are held by the two clamps 6a, 6b of one pair.

The programming unit then actuates the lifting of the balance bar 23, then the operation of the motor 5 for a number of steps which corresponds to the angular separation between a clamp 6a and the clamp 6b of the following pair in order to bring the latter to the place of the preceding one to form another loop.

At the same time, the programming unit actuates the operation of the stepping motor 16, during a number of steps which corresponds to one run of the belt 19 equal to the distance which separates a clamp 6a from the clamp 6b of the neighboring pair.

The pulses which are sent to the two stepping motors 5 and 16 during this simultaneous operation, are synchronized and the amplitudes vary in parallel in order that the accelerations in the speeds of the periphery of the conveyor of the notched belt may be equal at any moment and the wire remains taut without excess.

The stepping motor 16 is actuated by voltage pulses whose frequency increases and decreases following progressively in order to avoid accelerations or decelerations which are too sudden, which could lead to slippages of the wire on the notched belt 19 which would introduce measuring errors of the length of the wire lead.

The incremental coder associated with the roller 14a, enables detection of measurement errors.

The machine comprises a logic unit which compares the length of wire actually paid out which is measured by the coder and the length of wire theoretically paid out as a function of the number of steps of the motor 16.

Sudden distortions between these two data correspond to incidents such as slippage of the wire, jamming of the wire, step missing of the motor etc . . . and their detection by the logic unit triggers an emergency stop and signaling of a fault. Distortions which are slow and of small amplitude arise from a variation in the length of wire paid out per step of the motor and their detection gives rise to an automatic correction of the length per step of the motor 17 to re-establish coincidence between the two data.

Figure 4:
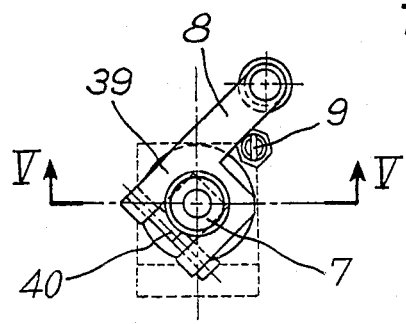

FIG. 4 is a view from above of a clamp 6 equipping the plate 4.

Figure 5:
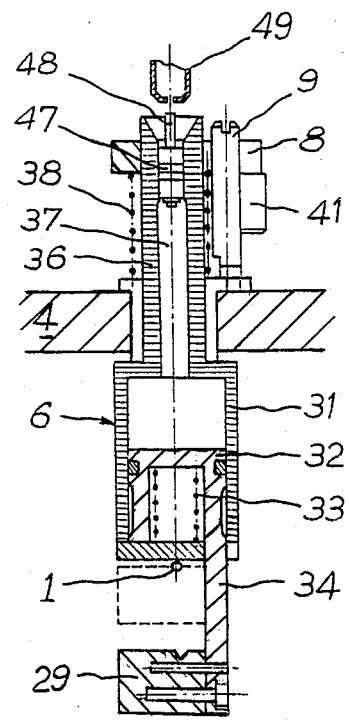
FIGS. 4 and 5 are respectively views from above, and an axial section of a clamp.

FIG. 5 is an axial section along V—V of FIG. 4.

Figure 6:
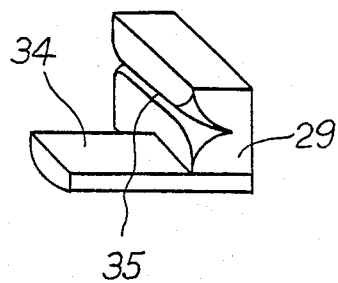
FIG. 6 is a perspective view of a clamp jaw.

FIG. 6 is a perspective view of the jaw 29 of a clamp.

In FIG. 4 is to be seen a view from above of the clamps similar to that of FIG. 1, in which the vertical axle 7, the arm 8 and the fixed stop 9 fixed to the plate 4 are seen.

It is seen from FIG. 5 that each clamp 6 includes a vertical cylindrical jack body 31 within which a piston 32 slides pushed by a spring 33. The piston is extended by a rod 34 which is extended beyond the inner end of the body of the jack and which bears, at its lower end, a jaw 29 urged against the lower end of the body of the jack as has been shown in dashed lines in FIG. 5 and the wire 1 then becomes gripped between the bottom of the body of the jack and the jaw 29 which comprises a groove 35 in which the wire is locked.

FIG. 6 shows in perspective a jaw 29 borne by a rod 34 and bearing a groove 35.

The cylindrical body 31 is extended upwards by a column 36 pierced by an axial duct 37 supplying the cylinder of the jack with compressed air. The column 36 passes through the plate and serves as vertical rotary axle around which the jack can make a quarter of a revolution. A torsional spring 38 is placed around the column 36. The arm 8 bears a yoke in the form of a fork 39 which is gripped by a bolt 40 on the square or polygonal upper end of the column 36.

The torsional spring 38 holds the arm 8 urged against the vertical stop 9. The torsional spring 38 can be doubled by a helical spring, which enables axial movement of the clamps when it is compressed. Such an axial movement is useful for certain working stations.

The arm 8 bears at its free end, a roller 41 which comes to be urged against a cam 42 or 43, visible in FIG. 1.

The rollers 41 of the clamps 6a become urged against the cam 42 which causes the clamps to rotate by a quarter of a revolution in the counterclockwise direction. The rollers 41 of the clamps 6b become supported on the cam 43 which causes them to rotate by a quarter of a revolution clockwise.

The cams 42 and 43 are placed above the plate 4 and forward of the front end of the paying-out station 10. They extend a little beyond a station 44 for cutting the wire which is placed in front of the paying-out station 10.

When the rollers 41 escape from the cams 42 and 43, the clamps pivot by a quarter revolution in opposite directions from one another under the effect of spiral springs 38 and come to be urged against the stops 9. This rotation by a quarter of a revolution in reverse direction has the effect of rotating by a quarter of a revolution the two ends 45a, 45b of each loop 28 of wire, situated beyond the two clamps 6a and 6b which bear the loop, which causes the two free ends to pass in a direction tangential to a direction transverse or radial to the plate 4, in which they extend outside the periphery of the plate 4, as is seen in FIG. 1, so that they present themselves in this position, to the various stations for processing 46₁, 46₂ . . . 46ₙ, situated at the periphery of the plate.

The processing stations are known stations which enable operations such as stripping of the ends, marking, positioning of connecting elements such as lugs, bushes, plugs, crimping of these devices, positioning of caps on these connecting parts, tinning the ends of the wires, etc . . . to be carried out automatically.

The invention is not directed to the construction of these automatic processing units which are known individually and of which the number and arrangement vary according to the case. It is directed to the device for cutting off leads of variable length and conveying these leads by the transfer conveyor 3, equipped with rotary clamps which enable the two ends 45a, 45b directed radially towards the outside of the plate to be presented, so that they are easily and simultaneously accessible to the various equipments provided at the successive processing stations 46₁, 46₂ . . . 46ₙ.

FIG. 5 shows an embodiment of a device for controlling the opening of the clamp 6. The latter is constituted by a valve 47, provided with a push rod 48, which closes the upper end of the passage 37.

To open the clamps compressed air is sent into the latter by means of two nozzles 49 situated above the plate 4, vertically over the position occupied by the two clamps 6a and 6b when they are opposite a delivery unit 50 for the equipped and processed wire leads.

The nozzles 49 then send compressed air into the cylnders 31 which push back the pistons 32 and open the jaws 29 of the two clamps. When the nozzle retracts, the valves 47 are closed and the clamps remain open until they arrive beneath an electro-magnet 30 which pushes back the push rod 48 of the valve, which drives out the compressed air and closes the clamp on the wire 1.

As a modification, it is possible to replace the valves by three-way electrovalves placed at the end of each column 36 and connected by piping to a source of compressed air. When the clamps pass opposite the delivery station 50, a contact sends to the electrovalves an order for opening which causes the opening of the clamps. When the clamps arrive at the forward end of the paying-out station, the electrovalve of the clamp 6a receives an operating order which places the passage 37 in communication with the atmosphere at the beginning of the formation of the loop 28 and the electrovalve of the clamp 6b receives the same order at the end of the formation of a loop 28.

According to another modification, it is possible to replace the valves 47 by two-way electrovalves and to place /two inflators opposite the delivery station 50. In this case, when the clamps are opposite the delivery station, the electrovalves are connected to the two inflators and they are opened and then closed. When the clamps arrive at the forward end of the paying-out station 10, the opening of the electrovalve equipping the clamp 6a is ordered and then the opening of the electrovalve equipping the clamp 6b respectively at the beginning and at the end of the formation of each loop.

Figure 7:
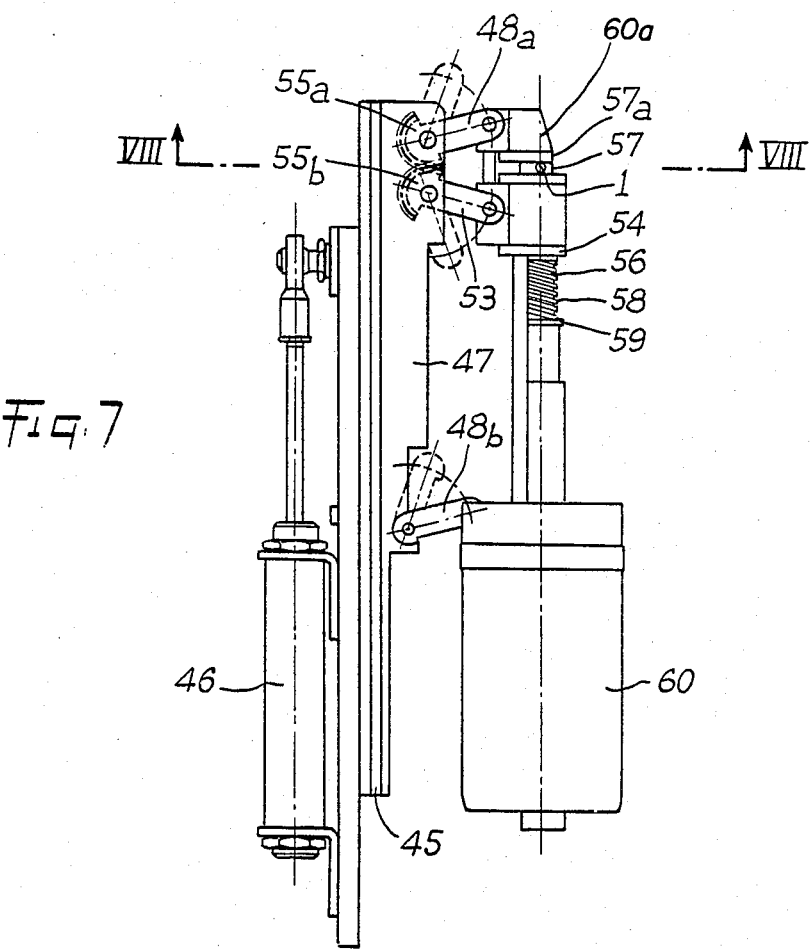
FIG. 7 is a vertical section of the cutting station of the wire.

FIG. 7 shows the unit 44 for cutting the wire which is seen in view from above in FIG. 1.

Figure 8:
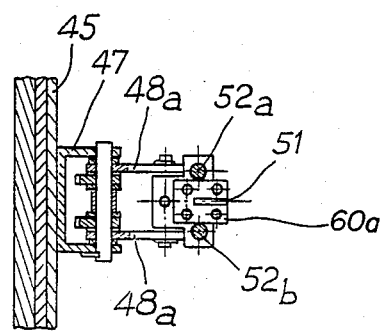
FIG. 8 is a transverse section along the line VIII—VIII of FIG. 7.

FIG. 8 is a transverse section along the line VIII—VIII of FIG. 7.

In FIG. 1 it is seen that the cutting module 44 for the wire is arranged radially with respect to the plate 4, a little in advance of the forward end of the paying-out module and that the cam 42 and 43 extend into the part which is situated opposite said cutting module.

The cutting module is supported by a plate 45 which can be moved radially by a jack 46. The plate 45 supports a frame 47 in the form of a chute parallel to the longitudinal axis of the module. On this frame 47 are mounted two pairs of articulated connecting rods 48a and 48b which constitute the two opposite sides of an articulated parallelogram. The connecting rod 48b supports the body of a jack 60 by means of one articulation. The connecting rod 48a supports a jaw 60a by another articulation.

FIG. 8 shows the jaw 60a borne by the pair of connecting rods 48a. It is seen that this jaw 60a includes a vertical slot 51.

The jaw 60a and the jack body 60 are conncted by two longitudinal tie-rods 52a, 52b which complete the articulated parallelogram.

The frame 47 supports a third pair of connecting rods 53 which are articulated to the frame and to a second jaw 54. The two pairs of connecting rods 48a and 53 each bear on their lower articulaton, a toothed sector 55a, 55b. These two toothed sectors 55a and 55b then mesh together, so that the movements of the connecting rods 48a and 53 are symmetrical with respect to the vertical plane of symmetry of the two lower articulations.

The forward end of the rod 56 of the jack 60 bears a vertical cutting blade 57 having a free edge 57a cut into a bevel. The blade 57 is slidably mounted in a vertical slot of the jaw 54. It has a thickness slightly less than the slot 51 and is located in the prolongation of this slot.

A spring 58 is placed around the rod 56, between the rear surface of the jaw 54 and a stop collar 59.

The cutting of the wire is carried out at the cutting station 44 at each point situated in the middle of the rectilinear portion of wire situated between the rear clamp 6b of the pair of clamps situated just after the cutting station and the front clamp 6a of the pair of clamps situated just before the cutting station.

The accumulated length of the two leads situated outside of the loop, beyond the two clamps which hold one loop, is equal to the fixed distance which separates a clamp 6a of one pair from the clamp 6b of the neighboring pair. This fixed length is taken into account to determine the length of the loops.

During the cutting operation, the plate 4 is stopped. The cutting operation proceeds in the following manner. By means of the jack 46, the movable plate is pushed forward and the jaws of the cutting unit are engaged between two neighboring pairs of clamps. At this moment, the connecting rods occupy a low position represented in dashed lines and the jaws are beneath the level of the wire 1. When a stroke-end sensor detects the correct positioning of the plate 45, it actuates the stopping of the jack 46 and the starting of the jack 60. The rod of the jack pushes the spring 58 which pushes the jaw 54 and causes the connecting rods 53 to pivot. At the same time, the connecting rods 48a pivot vertically and the connecting rods 48b pivot in parallel with the connecting rods 48a.

The assembly of jaws and of the jack 60 rises to the level of the wire 1 and the two jaws 60a and 54 close again on the wire immobilizing it rectilinearly. At this moment the jaw 54 can no longer advance and the thrust of the jack compresses the spring 58 and causes the relative forward movement of the blade 57 which shears the wire and is engaged in the slot 51. In this way a stamping out of the wire is obtained, without any deformation of the two ends of the wire. A stroke-end sensor reverses the movement of the jack 60, the two jaws separate and resume the position in dashed lines then the jack 46 brings back the unit to the rear and the plate 4 can advance to present opposite the shearing station the middle of the two following loops and a further cycle recommences.

Figure 10:
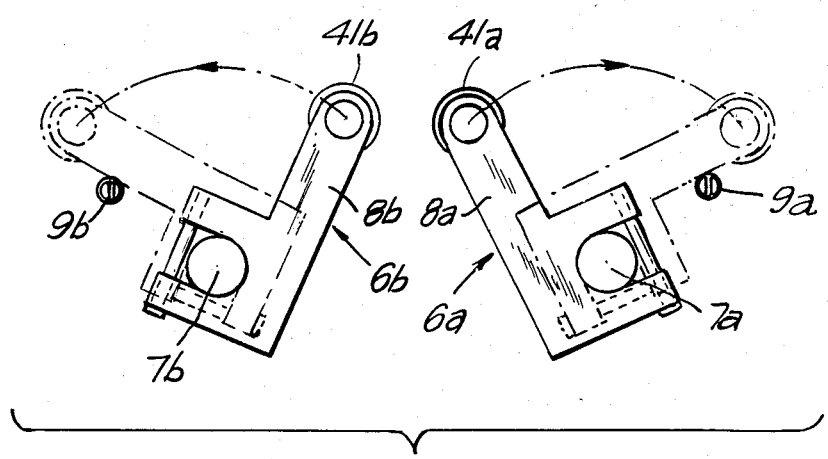
FIG. 10 shows in full lines the position of the clamps when they are just before or just after the cutting station against cams 42 and 43; the broken lines showing the position of the clamps when they have passed the cams.

FIG. 10 shows in full lines a top view of the two clamps 6a, 6b of the pair of clamps in the position that they have when they are just before or just after the cutting station 44.

Figure 11:
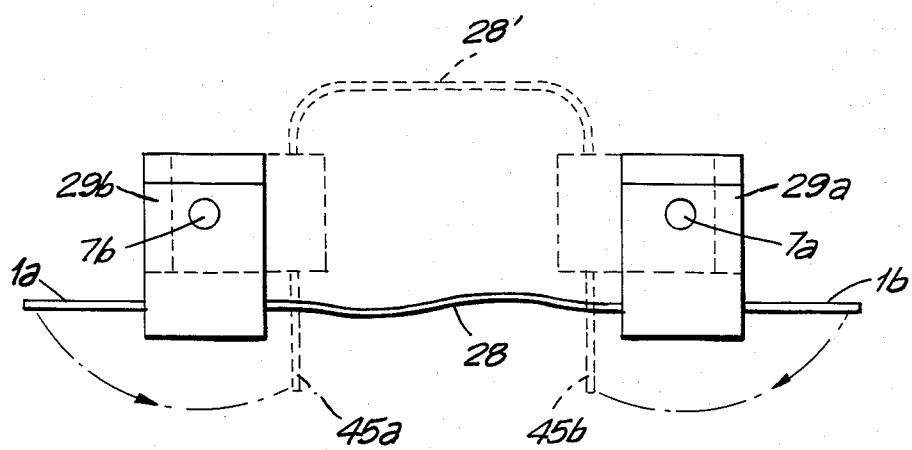
FIG. 11 shows in full lines and in broken lines the corresponding position of the jaws of each clamp and of the free ends of each wire.

In this position the rollers 41a and 41b bear respectively against the cams 42 and 43. FIG. 11 shows in full lines the respective position of the jaws 29aand 29b when the pair of clamps is just before or just after the cutting station.

A wire 1 is shown on the FIG. 11. This wire has been retained by the two jaws when they have passed in front of the paying out unit 10 and this wire is in the form of a loop 28 between the two clamps 29a and 29b. When the wire passes in front of the cutting station 44 it is cut in the middle point of the rectilinear portion comprised between the rear clamp 29b of a pair of clamps and the front clamp 29a of the following pair of clamps so that after the cutting station each wire comprises, as shown on FIG. 11, a loop 28 between the two clamps of a pair and two free ends 1a 1b situated beyond the two clamps 29a and 29b and tangential to the circular plate 4. FIG. 10 shows in broken lines the positions of the arms 8a, 8b of the clamps when the pair of clamps passes in front of the processing units $46_1$, $46_2$.

The rollers 41a, 41b have escaped to the respective cams 42, 43 and the arms 8a, 8b have been pivoted about a quarter of revolution, respectively, in the counter clockwise direction by the force exerted by the torsional springs 38 against the stops 9a and 9b.

FIG. 11 shows in broken lines the positions of the jaws 29a, 29b after this rotation of a quarter of a revolution. FIG. 11 also shows in dotted lines the positions of the free ends 45a, 45b which have a direction radial to the plate 4.

A machine according to the invention comprises a programming unit, for example an integrated circuit comprising memories and logic unit. The memories contain program instructions which determine the number of steps of advance of the motor 16 which determine the length of the loops 28 as a function of the length of the wire leads which must be provided by the machine.

All the wire leads may have the same length if it is desired to form bundles of wires of the same length.

An advantage of a machine according to the invention resides in the fact that it is possible to program manufacturing sequences of wire leads having different lengths.

The programming unit also controls the operating and stopping cycles of the stepping motor 5, which drives the conveyor 3.

During the formation of the loops, the conveyor 3 is stopped and the ends 45a, 45b of the various wire leads borne by the conveyor are placed opposite the successive working stations $46_1$, $46_2$ ... $46_n$ and the delivery station 50 and all these stations simultaneously carry out one operation during each time of stopping of the conveyor 3.

After this programming unit orders the movement of the conveyor 3 by an amount corresponding to the angular separation between the pairs of clamps and at the same time, it actuates the operation in synchronism of the stepping motor 16.

A machine according to the invention also enables the manufacture of wire leads comprising several loops in order to reduce the bulk in length which would be represented by a single loop or the packaging of a wire in folded form in adjoining loops.

To arrive at this result, it suffice not to cause the shearing unit to operate during several cycles of the transfer conveyor.

Figure 9:
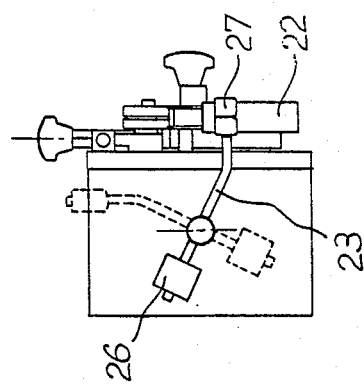
FIG. 9 is a forward end of the paying out station.

FIG. 9 is a view of the forward end of the paying-out station in which is seen the balance rod 23 and the pressure roller 27 which urges the wire against the drive roller 27.

It will be apparent that various modifications and changes may be made in the embodiments described and illustrated by those skilled in the art without departing from the scope of the invention which is intended to be defned in the following claims when viewed in their proper perspective against the prior art.

We claim:

1. Method for cutting off leads of discrete lengths from a wire and processing and equipping the two ends of said leads comprising:
    paying out the wire in a rectilinear direction;
    forming loops of specific length in the wire through the following steps;
    closing onto the wire a forward clamping device of a pair of clamping devices born by a circular transfer conveyor the periphery of which is tangential to the direction of paying out of the wire;
    advancing said circular transfer conveyor by a length equal to the distance between the two clamping devices of said pair at the same time as the wire is paid out;
    stopping the transfer conveyor;
    causing a pressor roller to drive the wire against a driving roller driven by a motor.
    unwinding a length of wire corresponding to the desired length of a loop and then closing the second clamping device of said pair on said wire;
    advancing said circular conveyor and said loops held by said clamping devices to a cutting station which cuts said wire between two loops;
    and pivoting by a quarter of revolution in reverse direction from one another, the two clamping devices of each pair after said cutting station in order to bring the two free ends of each wire lead to be presented transversely to the periphery of said circular conveyor and to extend beyond said periphery.

2. Machine for cutting off from a wire leads of predetermined length and for processing and equipping autommatically the two ends of said leads comprising:
    a circular plate which is rotated by a motor-reduction gear unit comprising a stepping motor and which bears pairs of close-set clamps distributed over its periphery;
    a paying-out station for said wire which is tangential to the periphery of said circular plate;
    a cutting station and several other processing units for said wire which are situated at the periphery of said circular plate after said paying out station;
    and means for causing the two clamps of each pair of clamps to pivot by a quarter revolution in reverse direction from one another before passing in front of said paying-out station and means for causing the two clamps of each pair of clamp to pivot again by a quarter of revolution in reverse direction from one anothr and from the prior pivoting after said cutting station in order to bring the two free ends of each wire lead to extend radially beyond the periphery of said circular plate when they pass in front of said processing units.

3. Machine according to claim 2, wherein said clamps each comprise a pneumatic jack with a vertical axle, a clamp jaw which is borne by a rod fast to the piston of said jack, a spring which tends to repel said piston into a withdrawn position where said jaw is urged against the bottom of said jack, means for supplying said jack with compressed air which are situated above said conveyor opposite the delivery station of the equipped wire leads and means for releasing the compressed air contained in said jacks which are situated above said conveyor close to the forward end of the paying-out station.

4. Machine according to claim 3, wherein said means for supplying said emptying said jacks comprise a valve provided with a push rod which is placed at the upper end of the supply pasage of each jack, two compressed air nozzles which are placed above said conveyor opposite said delivery station and an electro-magnet which is placed above said conveyor at the forward end of the paying-out station of the wire.

5. Machine for cutting off from a wire, leads of predetermined length and for processing and equipping automatically the two ends of said leads comprising:
    a circular plate which is rotated by a motor-reduction gear unit comprising a stepping motor and which bears pairs of closet-set clamps distributed over its periphery;
    a paying out station for said wire which is tangential to the periphery of said circular plate;
    a driving-roller driven by a motor which is situated to the forward end of said paying-out station and a presser roller which urges said wire against said driving roller to form loops;
    a cutting station for said wire situated radially to said circular plate forward of said paying-out station, wherein each clamp is pivotally mounted around a vertical axial and comprises a radical arm which is held applied by a torsional spring against a stop and which bears a roller and said machine comprises two cams which are situated above said circular plate and said rollers of said clamps become supported against said cams which cause said clamp to pivot in reverse direction from one another.

6. Machine according to claim 5 wherein said paying-out station for the wire comprises a stepping motor which drives a notched belt which passes over a return pulley and which comprises a horizontal upper stand and comprises a presser roller which urges said wire against the rear end of said upper strand of said notched belt.

7. Machine according to claim 5, wherein said station for cutting the wire comprises a plate which is moved perpendicularly to said conveyor by a first jack, which plate bears two pairs of articulated connecting rods which support a jack body and a jaw connected between them by tie rods, forming an articulated parallelogram and said plate bears a third of connecting rods which engage with the first pair of connecting rods through toothed sectors and the third pair of connecting rod bears a second jaw which is traversed by a slot and the rod of the jack bears a blade which traverses the second jaw.

* * * * *